United States Patent
Wang et al.

(10) Patent No.: US 8,098,343 B2
(45) Date of Patent: Jan. 17, 2012

(54) LIQUID CRYSTAL DISPLAY AND PIXEL UNIT THEREOF

(75) Inventors: Wen-Chun Wang, Taichung (TW); Chien-Ting Chan, Chang Hua County (TW); Yi-Chin Wang, Taichung County (TW)

(73) Assignee: Wintek Corporation, Taichung (TW)

( * ) Notice: Subject to any disclaimer, the term of this patent is extended or adjusted under 35 U.S.C. 154(b) by 497 days.

(21) Appl. No.: 12/347,589

(22) Filed: Dec. 31, 2008

(65) Prior Publication Data

US 2009/0174830 A1 Jul. 9, 2009

(30) Foreign Application Priority Data

Jan. 4, 2008 (TW) ............................... 97100274 A

(51) Int. Cl.
*G02F 1/136* (2006.01)
*G02F 1/1343* (2006.01)
(52) U.S. Cl. ............................... 349/48; 349/38; 349/114
(58) Field of Classification Search .................. 349/48, 349/38, 114, 43
See application file for complete search history.

(56) References Cited

U.S. PATENT DOCUMENTS

| | | | |
|---|---|---|---|
| 6,075,505 A | 6/2000 | Shiba et al. | |
| 6,563,481 B1 | 5/2003 | Watanabe et al. | |
| 6,850,302 B2 | 2/2005 | Song | |
| 6,936,845 B2 * | 8/2005 | Kim et al. | 257/59 |
| 7,002,652 B2 | 2/2006 | Wen et al. | |
| 7,084,942 B2 | 8/2006 | Luo | |
| 7,688,393 B2 * | 3/2010 | Ueda et al. | 349/48 |
| 2006/0274008 A1 | 12/2006 | Lin et al. | |

* cited by examiner

*Primary Examiner* — Thoi Duong
(74) *Attorney, Agent, or Firm* — Muncy, Geissler, Olds & Lowe, PLLC

(57) ABSTRACT

A pixel unit includes a first control circuit and a second control circuit and is divided into a first region and a second region. The first control circuit determines the output voltage of the first region and includes a first switching device, a first liquid crystal capacitor and a first storage capacitor coupled to the first switching device. The second control circuit determines the output voltage of the second region and includes a second switching device, a second liquid crystal capacitor and an auxiliary capacitor coupled to the second switching device, and a third switching device. The third switching device is coupled to the second switching device through the auxiliary capacitor, and the output voltage of the first region is different to that of the second region.

13 Claims, 9 Drawing Sheets

LIQUID CRYSTAL DISPLAY AND PIXEL UNIT THEREOF

CROSS REFERENCE TO RELATED APPLICATION

This application claims priority of application No. 097100274 filed in Taiwan R.O.C on Jan. 4, 2008 under 35 U.S.C. §119; the entire contents of which are hereby incorporated by reference.

BACKGROUND OF THE INVENTION

1. Field of the Invention

The invention relates to a pixel unit and a liquid crystal display having the pixel unit, and particularly to a pixel unit having different regions that correspond to their respective V-T characteristic curves.

2. Description of the Related Art

FIG. 1 shows an equivalent circuit diagram for a pixel unit of a transflective LCD having a single cell gap. Each pixel unit has a reflective region Re and a transmissive region Tr, and light propagates through the reflective region Re achieves a phase difference that is about twice as the phase difference achieved by the light propagating through the transmissive region Tr. Hence, as shown in FIG. 1, the reflective region Re and the transmissive region Tr are respectively corrected by reflectance and transmittance gamma curves by means of two thin film transistors T1 and T2 to allow for competent optical matching.

FIG. 2 shows a schematic diagram illustrating drive architecture for the transflective LCD shown in FIG. 1. Referring to FIG. 2, the drive architecture 100 includes a thin film transistor array 102, a first image signal drive circuit 104, a second image signal drive circuit 106, and a scan signal drive circuit 108. Referring to both FIG. 1 and FIG. 2, the scan signal drive circuit 108 that generates scan signals is coupled to the gate of each thin film transistor through row electrodes G1A-G4A. The first image signal drive circuit 104 sequentially generates image signals that correspond to each scan signal, and the image signals are transmitted to the reflective region Re through column electrodes D1A-D4A and the thin film transistor corresponding to the reflective region Re (such as thin film transistor T1). The second image signal drive circuit 106 sequentially generates image signals that correspond to each scan signal, and the image signals are transmitted to the transmissive region Tr through column electrodes D1B-D4B and the thin film transistor corresponding to the transmissive region Tr (such as thin film transistor T2).

Though, in the above design, two thin film transistors T1 and T2 respectively control the reflective region Re and the transmissive region Tr to allow for competent optical matching in a single-cell-gap LCD, it requires complicated circuitry to implement the correction for gamma curves. For example, two image signal drive circuits and double column electrodes are needed as shown in FIG. 2. This considerably increases the fabrication cost and design complexity.

BRIEF SUMMARY OF THE INVENTION

An embodiment of the invention provides a pixel unit and a liquid crystal display having the pixel unit which has different regions that correspond to their respective V-T characteristic curves, so that a simplified drive architecture and lower fabrication cost are achieved and competent optical matching is also allowed.

According to an embodiment of the invention, a pixel unit comprises a first control circuit and a second control circuit. The first control circuit for controlling the output voltage of a first pixel region of the pixel unit and comprises a first switching device, a first liquid crystal capacitor and a first storage capacitor. The first liquid crystal capacitor and the first storage capacitor are coupled to the first switching device. The second control circuit for controlling the output voltage of a second pixel region of the pixel unit and comprises a second switching device, a second liquid crystal capacitor, an auxiliary capacitor and a third switching device. The second liquid crystal capacitor and the auxiliary capacitor are coupled to the second switching device. The third switching device is coupled to the second switching device through the auxiliary capacitors. The second pixel region and the first pixel region together constitute the spread area of the pixel unit, and the output voltage of the first pixel region is different to the output voltage of the second pixel region.

According to an embodiment of the invention, a liquid crystal display comprises a plurality of pixel units and a plurality of third switching devices. Each pixel unit comprises a first pixel region and a second pixel region that has a output voltage different to that of the first pixel region. The first pixel region is provided with a first switching device, a first liquid crystal capacitor and a first storage capacitor coupled to the first switching device. The second pixel region is provided with a second switching device, a second liquid crystal capacitor and an auxiliary capacitor coupled to the second switching device. The plurality of third switching devices is coupled to the second switching devices through the auxiliary capacitors.

According to the above embodiments, a pixel unit has two distinct characteristic V-T curves may be achieved by the use of typical TFT fabrication processes for forming the auxiliary capacitor and the third switching device and this feature may enhance optical performance in different aspects. For example, the color shift in a wide-viewing-angle LCD, which is formed when the LCD is viewed further away from a perpendicular viewing angle, can be reduced. Alternatively, the optical matching of the reflective region and the transmissive region is enhanced in a transflective LCD. In addition, competent optical matching may be obtained by the use of typical TFT fabrication processes without additional fabrication cost and complicated drive architecture.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
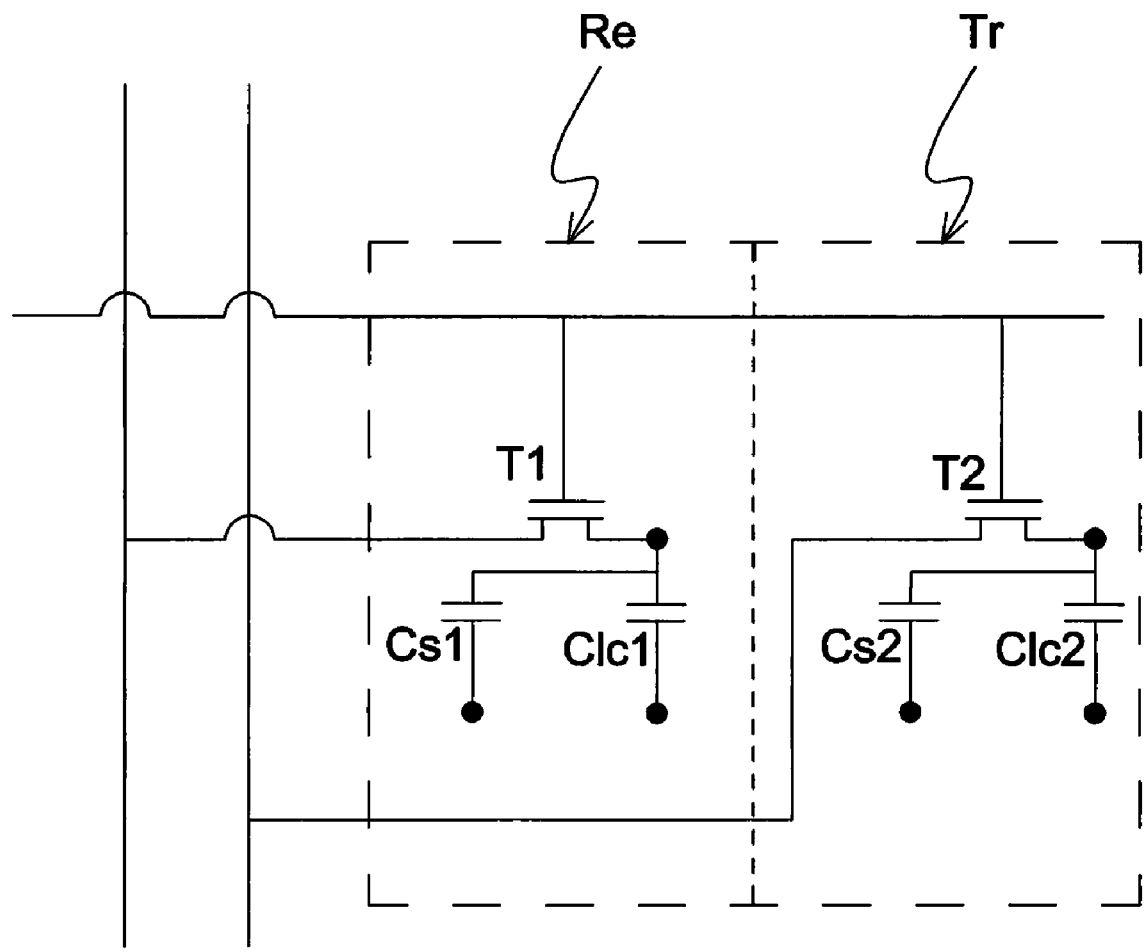
FIG. 1 shows an equivalent circuit diagram for a pixel unit of a transflective LCD having a single cell gap.
Figure 2:
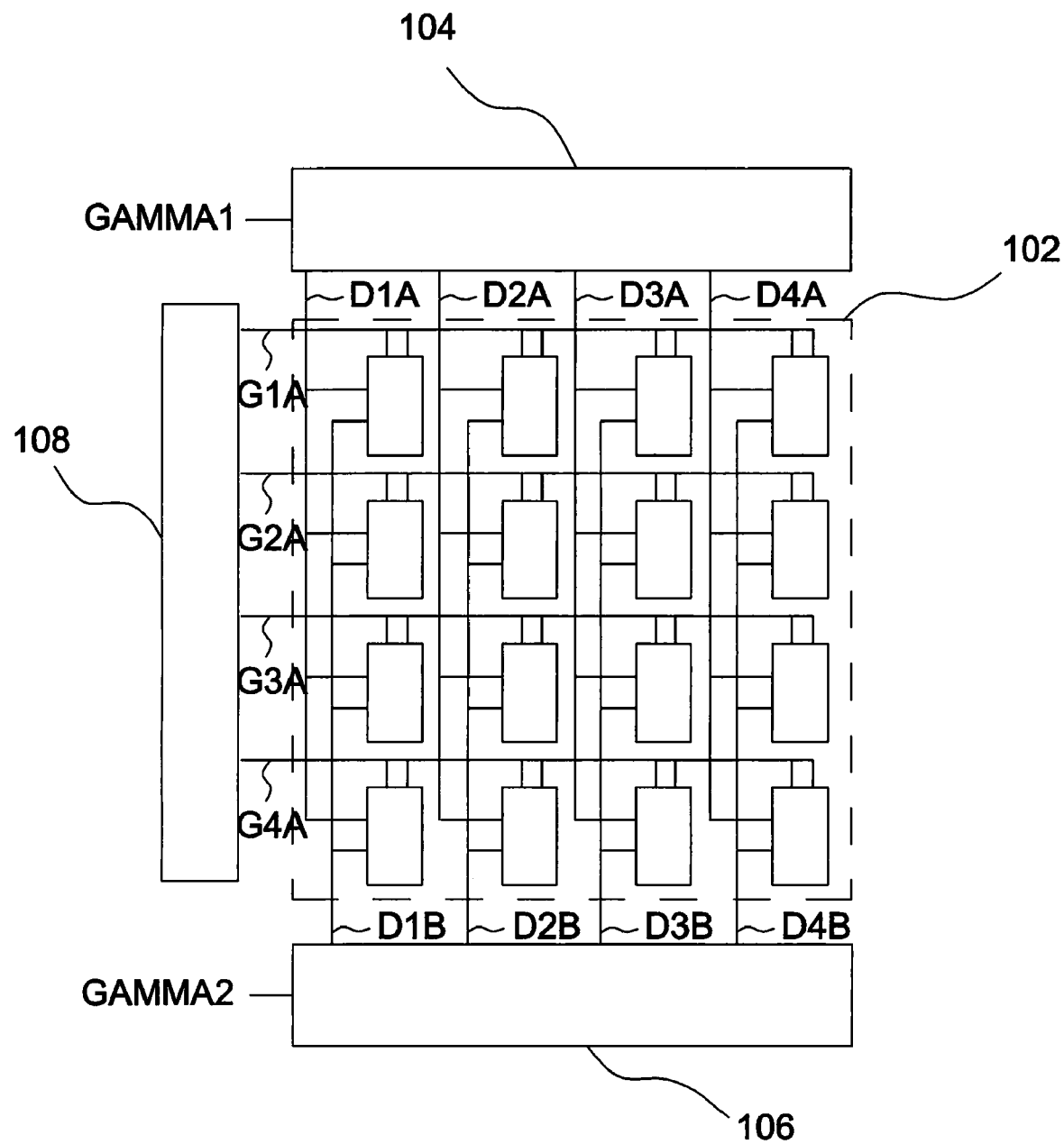
FIG. 2 shows a schematic diagram illustrating drive architecture for the transflective LCD shown in FIG. 1.
Figure 3:
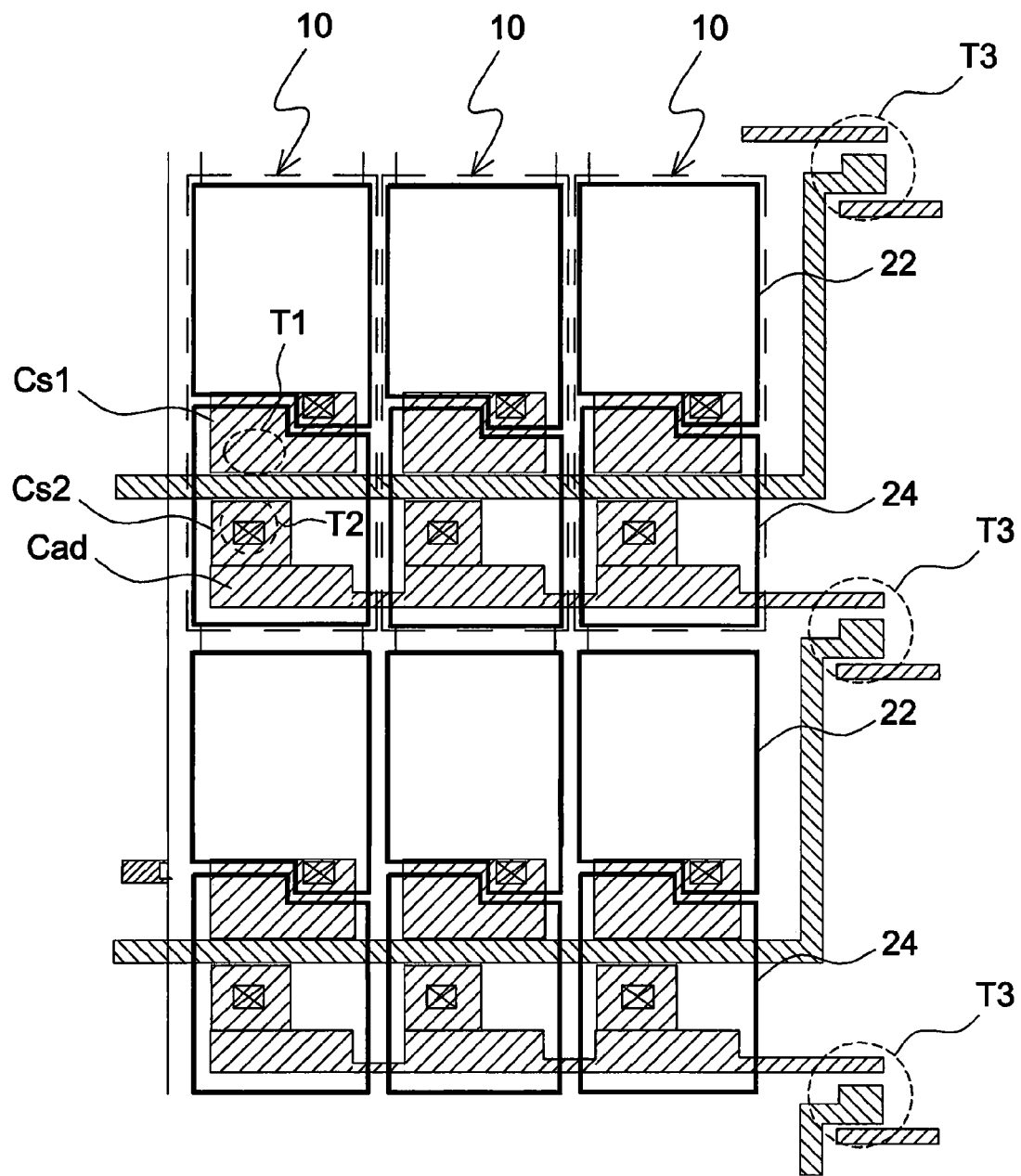
FIG. 3 shows a schematic diagram of a liquid crystal display (LCD) according to an embodiment of the invention.
Figure 4:
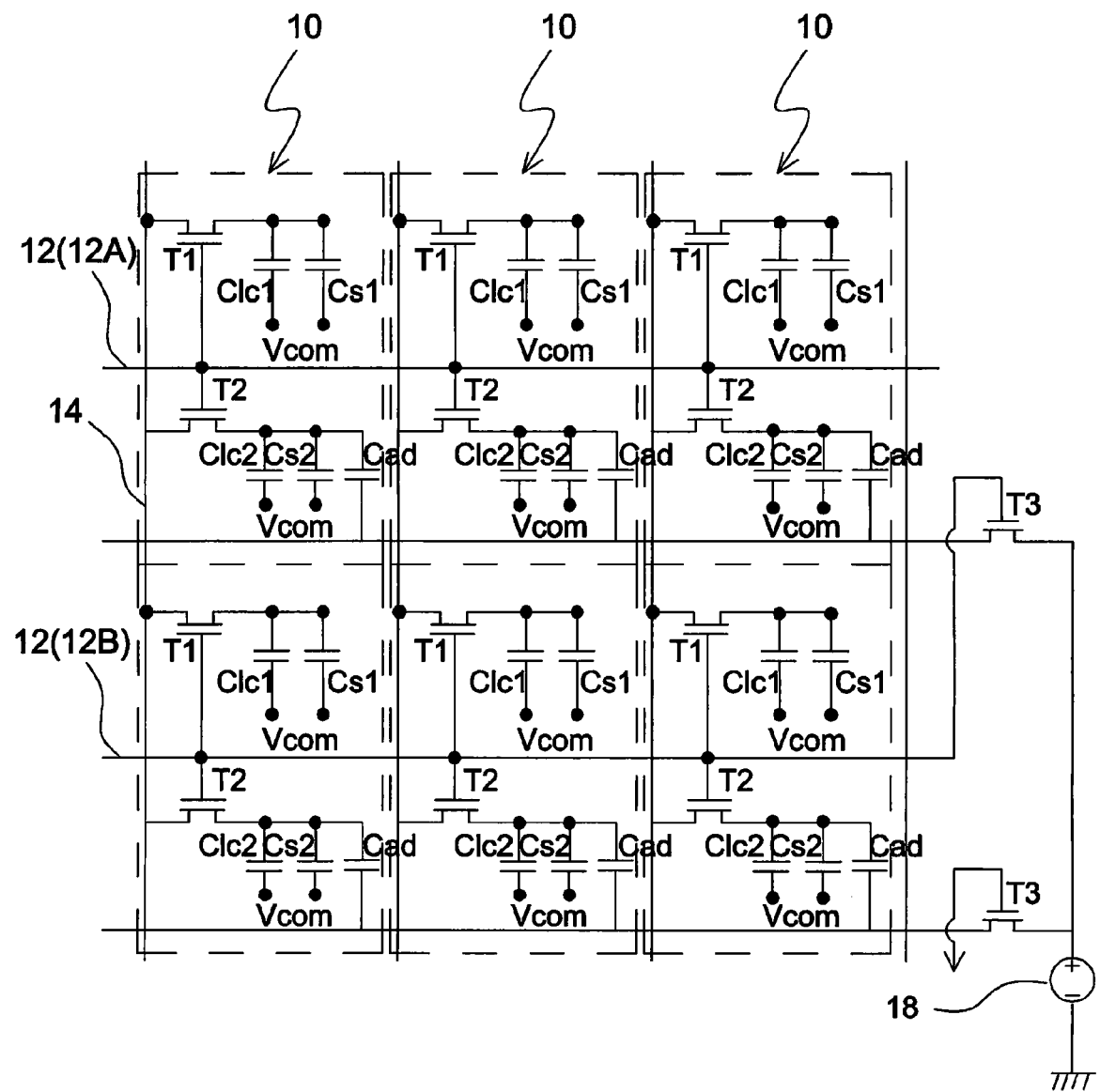
FIG. 4 shows an equivalent circuit diagram of the LCD shown in FIG. 3.

FIG. 3 shows a schematic diagram of a liquid crystal display (LCD) according to an embodiment of the invention. FIG. 4 shows an equivalent circuit diagram of the LCD. Referring to both FIG. 3 and FIG. 4, in this embodiment, a pixel unit 10 is divided into a first pixel region and a second pixel region. A thin film transistor T1, a storage capacitor Cs1, and a liquid crystal capacitor Clc1 is formed in the first pixel region. The liquid crystal capacitor Clc1 is formed by a first pixel electrode 22 and a common electrode (not shown) that are spaced apart from each other by a liquid crystal layer (not shown), and the storage capacitor Cs1 and the liquid crystal capacitor Clc1 are coupled to the thin film transistor T1. A thin film transistor T2, a storage capacitor Cs2, a liquid crystal capacitor Clc2 and an auxiliary capacitor Cad are formed in the second pixel region. The liquid crystal capacitor Clc2 is formed by a second pixel electrode 24 and a common electrode (not shown) that are spaced apart from each other by a liquid crystal layer (not shown). The storage capacitor Cs2 and the liquid crystal capacitor Clc2 are coupled to the thin film transistor T2. The gates of the thin film transistors T1 and T2 are coupled to the same scan line 12, the drains of the thin film transistor T1 and T2 are coupled to the same data line 14. Further, each auxiliary capacitor Cad is coupled to the source of the thin film transistor T2, all thin film transistors T2 in one row of pixel units 10 are coupled to a same thin film transistor T3 through an auxiliary capacitor Cad. Specifically, the drain of the thin film transistor T3 is coupled to the source of the thin film transistor T2 through the auxiliary capacitor Cad. The source of the thin film transistor T3 is coupled to an alternating current (AC) or direct current (DC) voltage source and then grounded. The gate of the thin film transistor T3 is coupled to a succeeding-staged scan line, for example, the gate of the thin film transistor T3 in a row of pixel units that corresponds to a scan line 12A is coupled to a succeeding-staged scan line 12B. Further, the thin film transistor T3 may be formed in a non-active display area to improve the aperture ratio of an LCD.

According to the above design, the output voltage $\Delta V_1$ for the first pixel region of the pixel unit 10 satisfies:

$$\Delta V_1 = \Delta V\text{com}*[(Clc+Cs)/(Clc+Cs+Cgs)],$$

and the output voltage $\Delta V_2$ for the second pixel region of the pixel unit 10 satisfies:

$$\Delta V_2 = \Delta V\text{com}*[(Clc+Cs)/(Clc+Cst+Cgs+Cad)].$$

, wherein Clc represents the capacitance of a liquid crystal capacitor, Cs represents the capacitance of a storage capacitor, Cgs represents the capacitance of a gate/source parasitic capacitor, and Cad represents the capacitance of an auxiliary capacitor. The values of the output voltages $\Delta V_1$ and $\Delta V_2$ can be arbitrary selected by adjusting the width/length ratio of the thin film transistor T3 or the capacitance of the auxiliary capacitor Cad.

Figure 5:
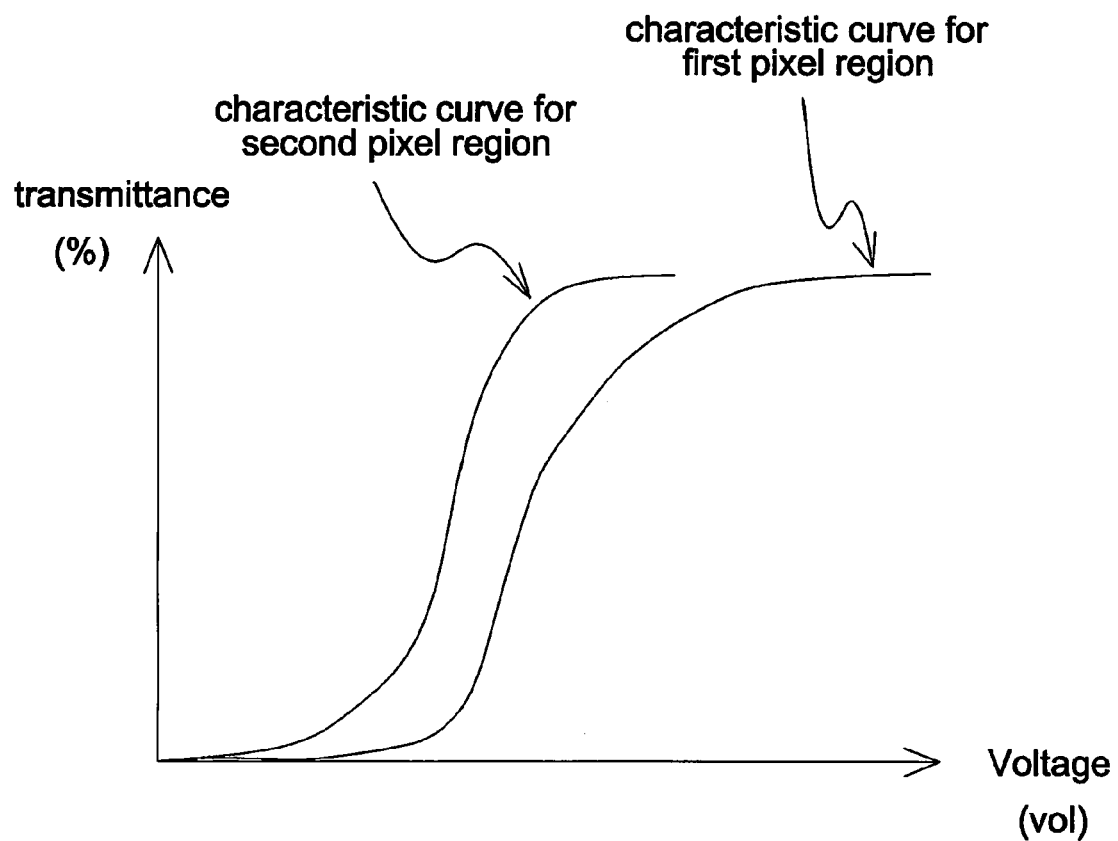
FIG. 5 shows two V-T characteristic curves corresponding to their different regions in a same pixel unit according to an embodiment of the invention.

Hence, as shown in FIG. 5, the width/length ratio of the thin film transistor T3 or the capacitance of the auxiliary capacitor Cad can be adjusted to achieve two distinct characteristic V-T curves, and this feature may enhance optical performance in different aspects. For example, in a wide-viewing-angle LCD, the formation of two distinct characteristic V-T curves allows for reducing color shift formed when the LCD is viewed further away from a perpendicular viewing angle (i.e., avoid the color wash-out phenomenon). Alternatively, in a transflective LCD, the formation of two distinct characteristic V-T curves may enhance the optical matching of the reflective region and the transmissive region. Note the V-T curve shown in FIG. 5 is merely for exemplified purposes, and the V-T curves for the first pixel region and the second pixel region may be varied by adjusting the width/length ratio of the thin film transistor T3 or the capacitance of the auxiliary capacitor Cad.

Figure 6B:
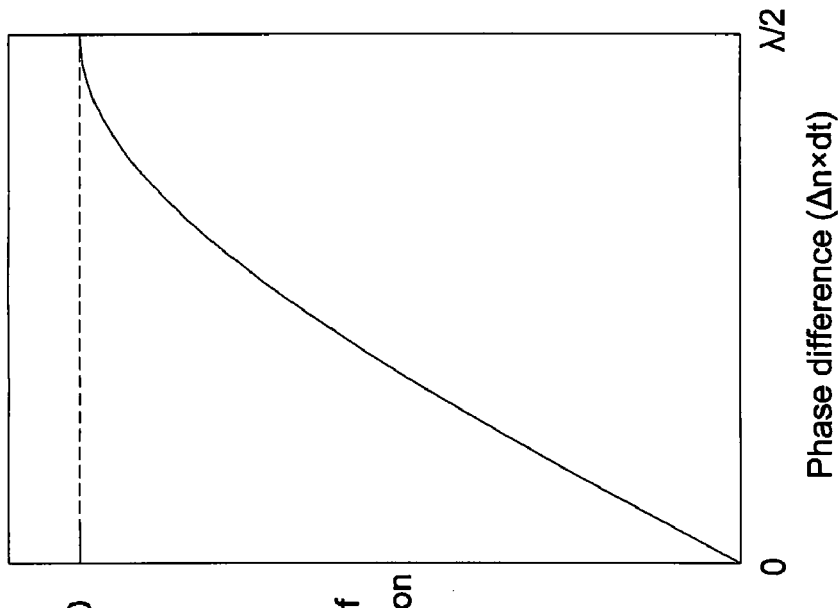
FIG. 6B shows the relationship between the phase difference Δ n×dr and the intensity of transmission.
Figure 6A:
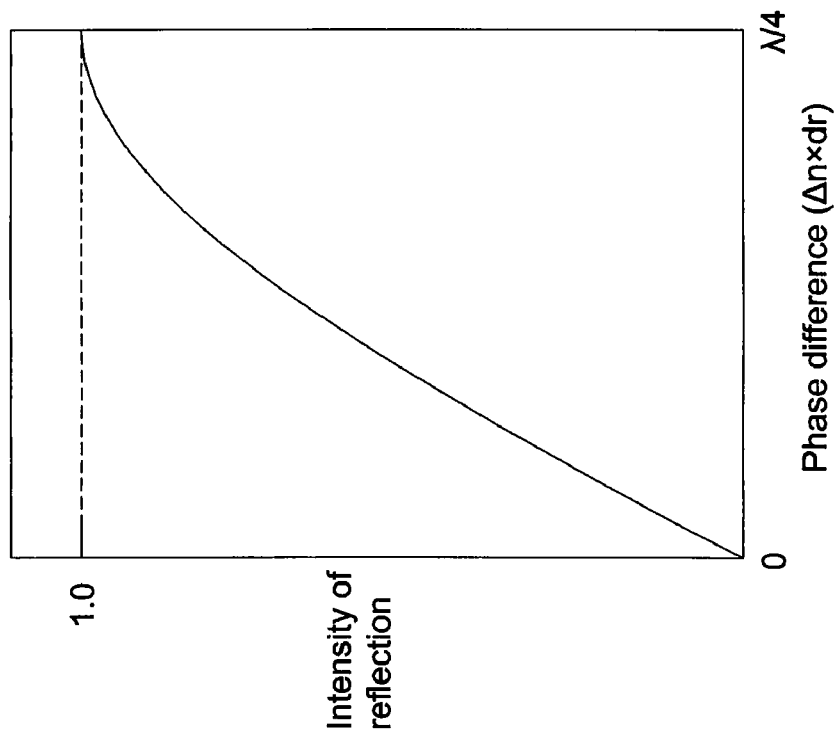
FIG. 6A shows the relationship between the phase difference Δ n×dr and the intensity of reflection.
Figure 7:
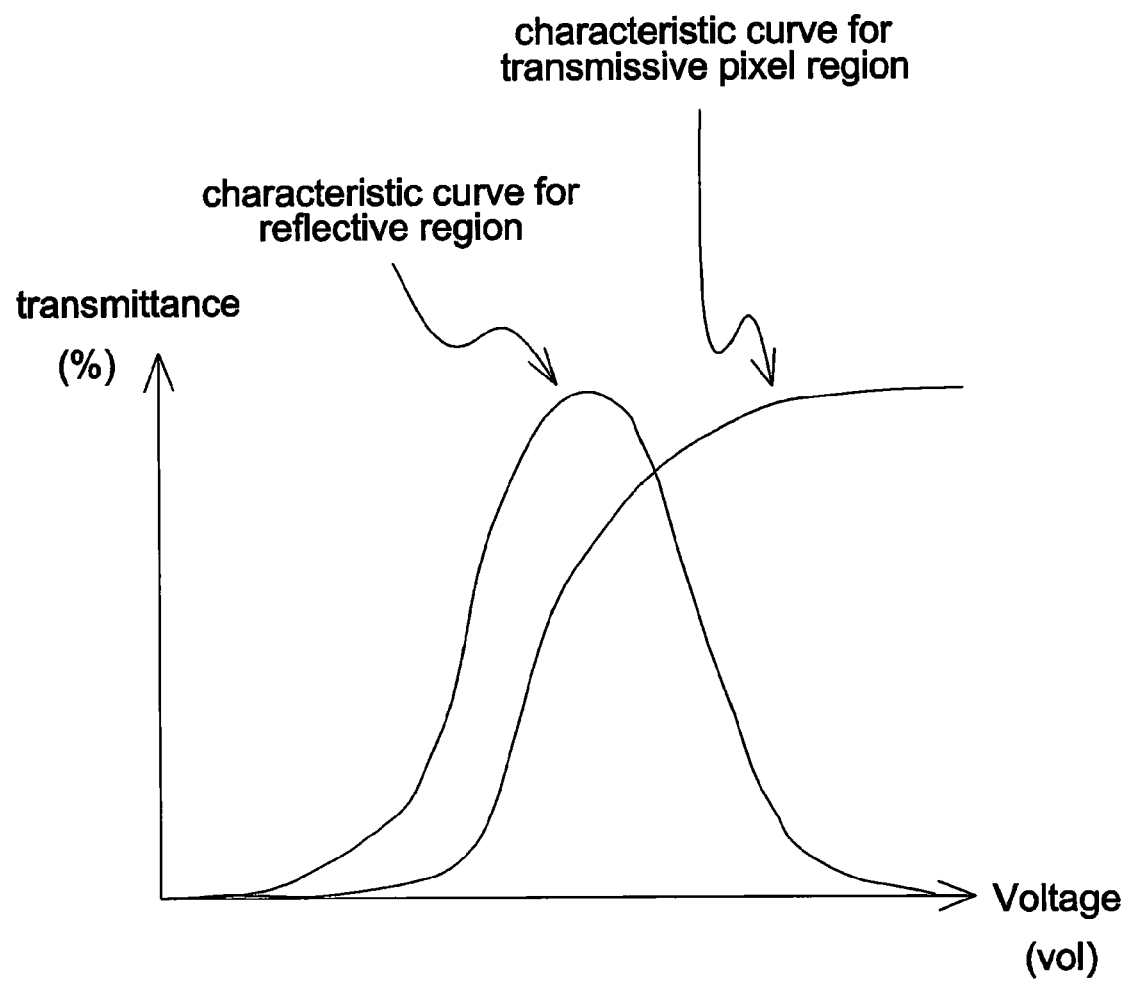
FIG. 7 shows V-T characteristic curves respectively corresponding to reflective and transmissive regions in the transflective LCD according to an embodiment of the invention.

Referring to both FIG. 6A and FIG. 6B, if λ represents a wavelength of light, Δ n represents birefringence of liquid crystal, dr is the cell gap in the reflective region Re, and dt is the cell gap in the transmissive region Tr, the intensity of reflected light in the reflective region Re becomes maximum when the product Δ n×dr (phase difference) equals λ/4. Relationship between the product Δ n×dr and the intensity of reflection is shown in FIG. 6A. In comparison, the intensity of transmitted light in the transmissive region Tr becomes maximum when the product Δ n×dt equals λ/2. Relationship between the product Δ n×dt and the intensity of transmission is shown in FIG. 6B. In case the first pixel region of pixel unit 10 shown in FIG. 3 is a transmissive region Tr of a transflective LCD and the second pixel region of pixel unit 10 shown in FIG. 3 is a reflective region Re of a transflective LCD, different drive voltages for respective the transmissive region Tr and the reflective region Re are required because the transmissive region Tr and the reflective region Re that are both coupled to a same data line have different optical matching. Hence, as shown in FIG. 7, since a same pixel unit generates two different V-T characteristic curves that have different characteristics, the two different V-T characteristic curves may respectively correspond to the transmissive region Tr and the reflective region Re. As a result, the transmissive region Tr and the reflective region Re may allow for competent optical matching without adjustment of the cell gap.

Hence, through typical TFT fabrication processes for forming auxiliary capacitors Cad and thin film transistors T3, two different voltage differences are obtained that are respectively between a first pixel electrode 22 and the common electrode and between a second pixel electrode 24 and the common electrode Vcom. In other words, two different regions in a same pixel unit that are both coupled to a same data line have different drive voltages so that competent optical matching may be obtained by the use of typical TFT fabrication processes without additional fabrication cost and complicated drive architecture. In addition, the first pixel electrode 22 and the second pixel electrode 24 may be reflective pixel electrodes and transmissive pixel electrodes. If the auxiliary capacitor Cad is formed in the reflective region, it may be deemed a part of the reflective structure. In one embodiment, an LCD may include both reflective pixel units and transmissive pixel units. Each transmissive pixel unit includes a thin film transistor T1, a storage capacitor Cs1, and a liquid crystal capacitor Clc1. Each reflective pixel unit includes a thin film transistor T2, a storage capacitor Cs2, liquid crystal capacitor Clc2, and an auxiliary capacitor Cad. Further, in one embodiment, the storage capacitor Cs2 in the reflective structure may be replaced with an auxiliary capacitor Cad.

Figure 8:
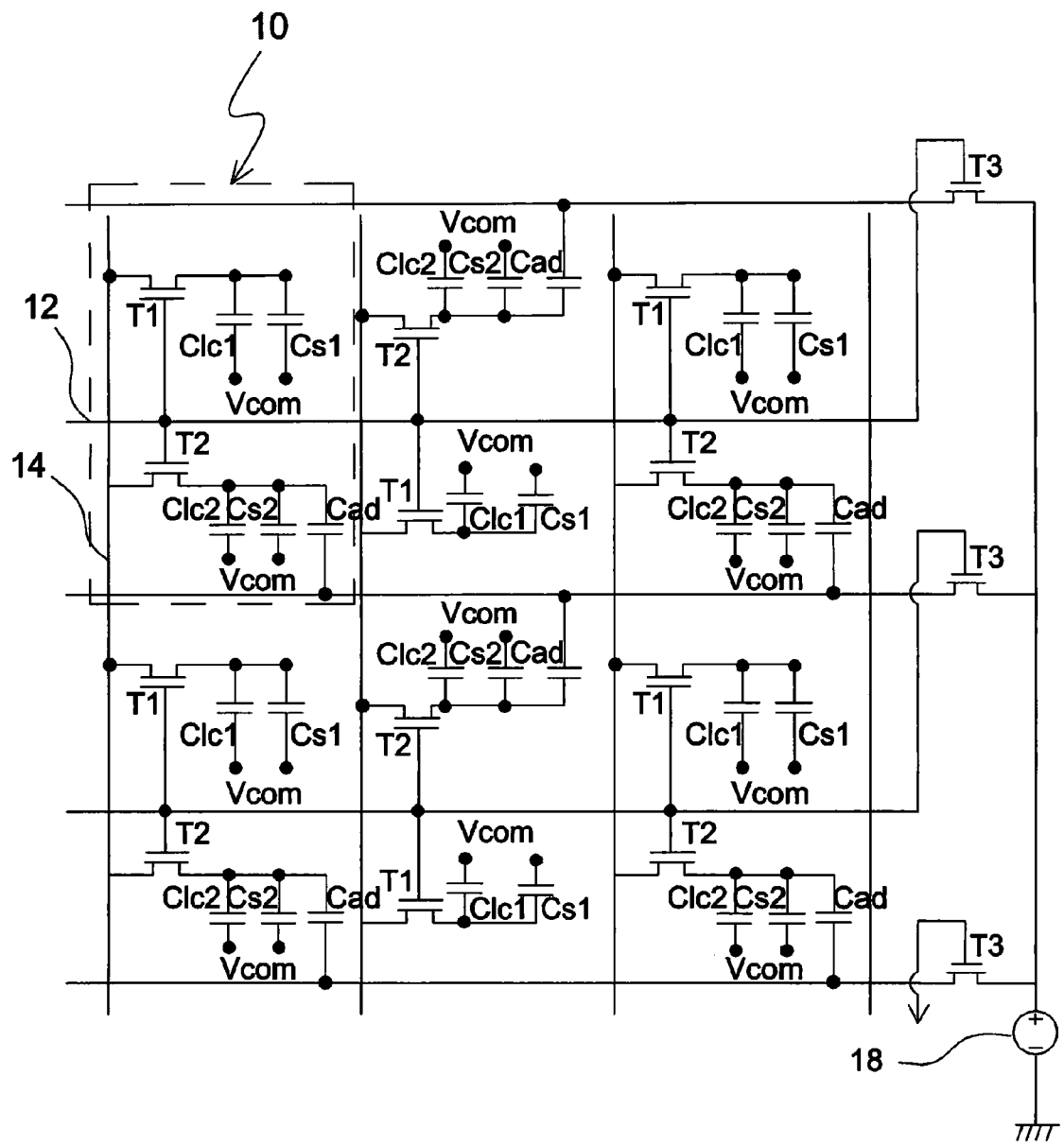
FIG. 8 shows an equivalent circuit diagram according to another embodiment of the invention.

FIG. 8 shows an equivalent circuit diagram according to another embodiment of the invention. In this embodiment, each thin film transistor T3 is alternately coupled to a first thin film transistor T2 in a top row of pixel units and a second thin film transistor T2 in a bottom row of pixel units. The width/length ratio of the thin film transistor T3 or the capacitance of the auxiliary capacitor Cad can be adjusted to achieve two distinct characteristic V-T curves.

Figure 9:
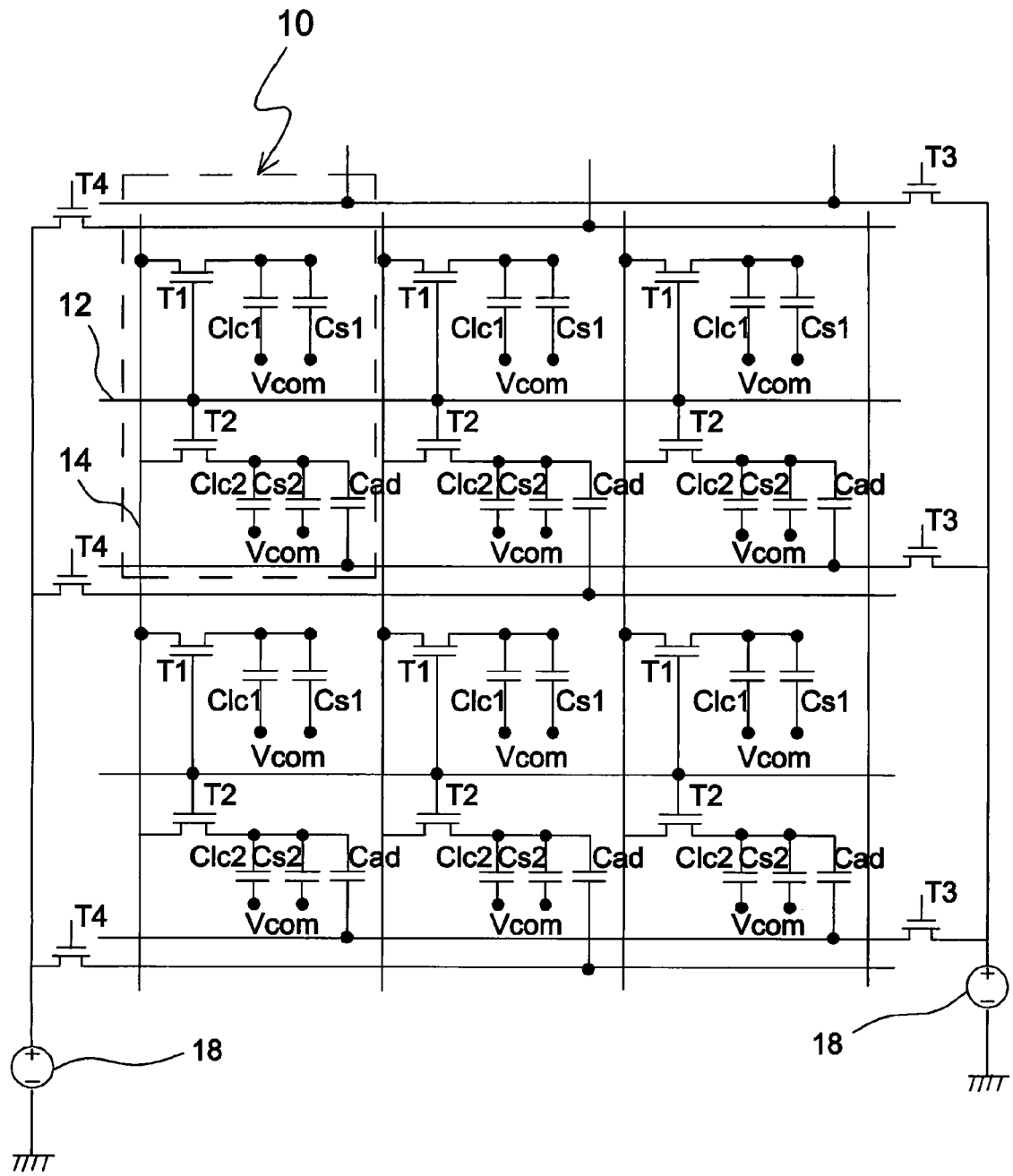
FIG. 9 shows an equivalent circuit diagram according to another embodiment of the invention.

FIG. 9 shows an equivalent circuit diagram according to another embodiment of the invention. In this embodiment, besides the thin film transistor T3 shown in the above embodiments, multiple thin film transistors T4 each corresponding to a thin film transistor T3 are additionally provided. As shown in FIG. 9, in one row of pixel units, an odd-numbered pixel unit is coupled to a thin film transistor T3 through an auxiliary capacitor Cad, and an even-numbered pixel unit is coupled to an adjacent thin film transistor T4 through an auxiliary capacitor Cad. Alternatively, each pixel unit in the same column may be alternately coupled to a thin film transistor T3 and a thin film transistor T4 to achieve two different V-T characteristic curves.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel unit, comprising:
   a first control circuit for controlling an output voltage of a first pixel region of the pixel unit, the first control circuit comprising:
      a first switching device;
      a first liquid crystal capacitor coupled to the first switching device; and
      a first storage capacitor coupled to the first switching device; and
   a second control circuit for controlling an output voltage of a second pixel region of the pixel unit, with the second pixel region and the first pixel region together constitute a spread area of the pixel unit, the second control circuit comprising:
      a second switching device;
      a second liquid crystal capacitor coupled to the second switching device;
      an auxiliary capacitor coupled to the second switching device; and
      a third switching device coupled to the second switching device through the auxiliary capacitors;
   wherein the output voltage of the first pixel region is different to the output voltage of the second pixel region, the first pixel region is a transmissive region, and the second pixel region is a reflective region.

2. The pixel unit as claimed in claim 1, wherein the first liquid crystal capacitor is formed by a transparent pixel electrode and a common electrode that are spaced apart from each other by a liquid crystal layer, and the second liquid crystal capacitor is formed by a reflective pixel electrode and a common electrode that are spaced apart from each other by the liquid crystal layer.

3. The pixel unit as claimed in claim 2, wherein a voltage difference between the transparent pixel electrode and the common electrode is different to a voltage difference between the reflective pixel electrode and the common electrode.

4. A liquid crystal display, comprising:
   a plurality of pixel units, each pixel unit comprises a first pixel region and a second pixel region that has an output voltage different to that of the first pixel region, the first pixel region being provided with a first switching device, a first liquid crystal capacitor and a first storage capacitor coupled to the first switching device, the second pixel region being provided with a second switching device, a second liquid crystal capacitor and an auxiliary capacitor coupled to the second switching device; and a plurality of third switching devices coupled to the second switching devices through the auxiliary capacitors, wherein the pixel units are arranged into multiple rows, and all of the second switching devices in each row of pixel units are coupled to a third switching device through the auxiliary capacitors.

5. The liquid crystal display as claimed in claim 4, wherein a control terminal of the first switching device is coupled to a Nth (N≧1; N is a positive integer) scan line, a control terminal of the second switching device is coupled to a Nth scan line, and a control terminal of the third switching device is coupled to a (N+1)th scan line.

6. The liquid crystal display as claimed in claim 4, wherein the second pixel region further comprises a second storage capacitor coupled to the second switching device.

7. The liquid crystal display as claimed in claim 4, wherein the first and second switching devices are a first and second thin film transistors, respectively, the gates of the first and second thin film transistors are coupled to a same scan line, and the drains of the first and second thin film transistors are coupled to a same data line.

8. The liquid crystal display as claimed in claim 7, wherein the third switching device is a third thin film transistor, the drain of the third thin film transistor is coupled to the second switching device through the auxiliary capacitor, and the source of the third thin film transistor is coupled to a voltage source and grounded.

9. A liquid crystal display, comprising:

a plurality of pixel units, each pixel unit comprises a first pixel region and a second pixel region that has an output voltage different to that of the first pixel region, the first pixel region being provided with a first switching device, a first liquid crystal capacitor and a first storage capacitor coupled to the first switching device, the second pixel region being provided with a second switching device, a second liquid crystal capacitor and an auxiliary capacitor coupled to the second switching device; and a plurality of third switching devices coupled to the second switching devices through the auxiliary capacitors, wherein the first pixel region is a transmissive region and the second pixel region is a reflective region.

10. The liquid crystal display as claimed in claim 9, wherein the first liquid crystal capacitor is formed by a transparent pixel electrode and a common electrode that are spaced apart from each other by a liquid crystal layer, and the second liquid crystal capacitor is formed by a reflective pixel electrode and a common electrode that are spaced apart from each other by the liquid crystal layer.

11. The liquid crystal display as claimed in claim 10, wherein a voltage difference between the transparent pixel electrode and the common electrode is different to a voltage difference between the reflective pixel electrode and the common electrode.

12. The liquid crystal display as claimed in claim 9, wherein the pixel units are arranged into multiple rows, and each third switching device is alternately coupled to the second switching devices that are respectively in two adjacent rows of pixel units.

13. The liquid crystal display as claimed in claim 9, further comprising:

a plurality of fourth switching devices, wherein the number of the fourth switching devices is the same as the number of the third switching devices, the pixel units are arranged into multiple columns and multiple rows, and each two adjacent pixel units in each row or each column are respectively coupled to the third switching device and the fourth switching device.

\* \* \* \* \*